United States Patent
Areaux et al.

(10) Patent No.: US 6,893,607 B2
(45) Date of Patent: May 17, 2005

(54) ELEVATED DISCHARGE GAS LIFT BUBBLE PUMP AND FURNACE FOR USE THEREWITH

(75) Inventors: Larry D. Areaux, Punta Gorda, FL (US); Edward S. Jackson, Steamboat Springs, CO (US)

(73) Assignee: Premelt Systems, Inc.

( * ) Notice: Subject to any disclaimer, the term of this patent is extended or adjusted under 35 U.S.C. 154(b) by 0 days.

(21) Appl. No.: 10/440,374

(22) Filed: May 16, 2003

(65) Prior Publication Data

US 2003/0197313 A1 Oct. 23, 2003

Related U.S. Application Data

(60) Provisional application No. 60/447,434, filed on Feb. 14, 2003.

(51) Int. Cl.[7] ................................................. C21C 7/00
(52) U.S. Cl. ...................... 266/217; 266/233; 266/236; 266/900; 266/901; 222/603
(58) Field of Search .......................... 222/603; 266/217, 266/233, 236, 900, 901

(56) References Cited

U.S. PATENT DOCUMENTS

| | | | | |
|---|---|---|---|---|
| 3,932,173 A | * | 1/1976 | Collin et al. | 75/10.15 |
| 5,211,744 A | * | 5/1993 | Areaux et al. | 75/594 |
| 5,984,999 A | * | 11/1999 | Areaux | 75/583 |
| 6,068,812 A | * | 5/2000 | Areaux et al. | 266/217 |

* cited by examiner

Primary Examiner—Melvyn Andrews
(74) Attorney, Agent, or Firm—Sand & Sebolt

(57) ABSTRACT

A metal melting closed furnace which includes a main chamber, a circulation well connected to the main chamber by a communications passageway and a vortex well having a exit outlet for molten metal into the main chamber. A cover is emplaced over the vortex well. An inert gas bubble activated molten metal pump is provided in which there is an entry port in the circulation well and exit port into the vortex well. The exit port is positioned to lie at least partially or entirely above the maximum level of molten metal in the vortex well. This exit port will typically be at or near the top of the vortex well. In order to reduce oxidation, inert gas bubbles are captured from this molten metal pump and creating an inert gas atmosphere or blanket above the molten metal vortex.

27 Claims, 10 Drawing Sheets

ELEVATED DISCHARGE GAS LIFT BUBBLE PUMP AND FURNACE FOR USE THEREWITH

CROSS-REFERENCE TO RELATED APPLICATIONS

This application claims priority from U.S. provisional application Ser. No. 60/447,434, filed Feb. 14, 2003.

BACKGROUND OF THE INVENTION

1. Technical Field

The present invention relates to metallurgical processes and apparatus, and more particularly to metallurgical processes and apparatus in which metal chips are melted in a molten metal vortex which is fed by an inert gas bubble-actuated molten metal pump.

2. Technical Background

My following U.S. patents disclose various apparatus and processes related to the introduction of metal chips into the charge-well of a metal melting furnace and the conveyance of molten metal from one place to another within or out of a metal melting furnace.

U.S. Pat. No. 4,710,126 discloses a process for producing dry metal chips. This process includes the steps of entraining fluid-containing metal chips in a gas, introducing the gas into a cyclone separator having an internal wall heated to fluid-vaporizing temperature by combustion in a surrounding chamber, purging and vaporizing fluid from said chips, exhausting hot gases and exiting dried metal chips from said separator, conducting hot gaseous products of combustion from the combustion chamber to a continuous centrifuge, extracting extractable fluid from starting metal chips in the centrifuge, entraining the chips in the hot gaseous products of combustion introduced into the centrifuge, and conducting the gaseous products with entrained chips from the continuous centrifuge to the cyclone separator, thereby providing an essentially closed system. The combustion chamber may be a part of an afterburner furnace and hot gases entraining vaporized oil exhausted from the cyclone separator may be recycled and employed as fuel for the combustion chamber.

U.S. Pat. No. 4,721,457 discloses a process for producing dried and cleaned metal chips by entraining metal chips in a gas, introducing the gas into a cyclone separator having a wall heated to fluid-vaporizing temperature by combustion effected in a surrounding chamber, purging fluid from said chips, exhausting hot gases and exiting dried metal chips from said separator, conducting hot gaseous products of combustion from the combustion chamber to a continuous centrifuge, extracting extractable fluid from starting metal chips, which may be previously uncleaned and/or unwashed, in the centrifuge, entraining the chips in the hot gaseous products of combustion introduced into the centrifuge, and conducting the gaseous products with entrained chips from the continuous centrifuge to the cyclone separator, thereby providing an essentially closed system. The combustion chamber may be a part of an afterburner furnace and hot gases entraining vaporized oil exhausted from the cyclone separator may be recycled and employed as fuel for the combustion chamber. Provision is made in the system for hot water and/or steam from either an external source of from a water jacket around the cyclone separator, preferably together with solvent and/or detergent, and a final chip drying step wherein the drying is effected using products of combustion which are en route back to the continuous centrifuge.

U.S. Pat. No. 4,872,907 discloses an apparatus and method for charging metal chips into a molten bath of the metal from which the chips are formed, comprising a compacting extruded and a delivery conduit which is resistant to the mass of molten metal and which is pivotable to dip into the molten metal bath when chips are being charged thereinto and out of contact with the bath when charging is to be discontinued, are disclosed. The chips are forced through the delivery conduit in the form of a compacted or densified mass preferably having a density between about 30 and 60 percent of the density of the solid metal and preferably between about 55 and 80 pounds per cubic foot. Feed is continued while the delivery conduit is in the molten metal bath and until it is removed therefrom to prevent entry of molten metal into the delivery conduit. The method is preferably conducted on a continuous basis and various sensors with appropriate wiring may be employed for safety and for making the method substantially automatic in operation.

U.S. Pat. No. 5,203,910 discloses a method for the conveyance of molten metal from one place to another, in a high-temperature molten metal pool in a metal-melting furnace or out of said molten metal pool, employing an at least partially-inclined elongated conveying conduit and gas feed means for feeding inert gas into the lower end of the conveying conduit and thereby inducing a flow of molten metal in and through said conveying conduit, is disclosed, along with suitable apparatus for carrying out the said method wherein the parts or elements coming into contact with the high-temperature molten metal pool are of a suitable refractory material.

U.S. Pat. No. 5,211,744 discloses a process for utilization of metal chips, especially scrap metal chips, particularly brass and aluminum, by introduction of the metal chips into a pool of molten metal of which they are formed or an alloy thereof. The process allows for minimization of fuel cost, heat loss, and minimal conversion of the metal at the surface of the molten metal pool to metal oxide, as well as an increase in the yield of utilizable metal from the remelting or recycling operation, by maintaining a non-oxidizing atmosphere at the surface of the molten metal pool and optionally utilizing vaporized residual impurities from chips being recycled such as oil, lacquer, or similar vaporizable impurity to assist in maintaining the non-oxidizing atmosphere. Elimination of impurity-removal steps previously required for preparation of the chips for recycling by introduction into such a molten metal pool is eliminated. Environmental pollution is also conveniently and simultaneously substantially reduced from vaporizable contaminants, fumes, and decomposition products of combustion thereof.

U.S. Pat. No. 5,395,424 discloses a method for the conveyance of molten metal from one place to another, in a high-temperature molten metal pool in a metal-melting furnace or out of said molten metal pool employing at least a partially-inclined elongated conveying conduit and gas feed means for feeding inert gas into the lower end of the conveying conduit is employed. A flow of molten metal in and through said conveying conduit, is disclosed, along with suitable apparatus for carrying out the said method wherein the parts or elements coming into contact with the high-temperature molten metal pool are of a suitable refractory material. According to the present invention, an intermittent or pulsating inert gas feed is employed to produce essentially spherical or cylindrical bubbles within the conveying conduit, thereby resulting in greater efficiency and economy because of the possibility of reducing the quantity of inert gas employed to induce the flow of an identical amount of molten metal.

U.S. Pat. No. 5,407,462 discloses a mass flow gravity feed furnace charger comprises a vertically-oriented elongated hollow conduit which is associated with an apertured heat-resistant charge-well cover adapted to lie essentially in contact with the upper surface of a molten metal pool in the charge well of a metal-melting furnace. Presized scrap metal charged into the conduit collects atop the surface of the molten metal pool, since the bottom opening of the conduit communicates with the charge-well cover aperture and permits the metal scrap to fall by gravity directly into the molten metal in the charge well. When the weight of the metal scrap column is sufficient to offset the resistance of the upper surface of the molten metal pool, the weight of the collected metal scrap gravitationally forces it into the molten metal mass it melts and is assimilated. Employment of the method and charge of the invention enables the controlled introduction of metal scrap by mass flow and gravity feed directly into and beneath the surface of the pool of molten metal and obviates numerous disadvantages and inconveniences of past practices.

U.S. Pat. No. 5,468,280 discloses a method for the conveyance of molten metal from one place to another in a high-temperature molten metal pool in a metal-melting furnace or out of said molten metal pool. At least partially-inclined elongated conveying conduit and gas feed means for feeding inert gas into the lower end of the conveying conduit is employed. A flow of molten metal is thereby inducted in and through said conveying conduit, is disclosed, along with suitable apparatus for carrying out the said method wherein the parts or elements coming into contact with the high-temperature molten metal pool are of a suitable refractory material. The inert gas is fed into the conveying conduit at a supersonic velocity, thereby simultaneously effecting a degassing of the molten metal while it is being conveyed.

U.S. Pat. No. 5,735,935 discloses an inert gas bubble-actuated molten metal pump which is located in a metal-melting furnace to effect circulation of molten metal throughout the furnace. The inert gas employed to actuate the molten metal pump is captured beneath a heat-resistant and flame-resistant cover located above the exit port of the pump and over a substantial portion of the molten metal to thereby to prevent splashing, spattering and disruption of a thin protective layer or skin of oxidized metal at the surface of the molten metal as well as to provide a non-oxidizing atmosphere at the surface of the molten metal beneath said cover. In this manner the inert gas is employed efficiently and economically.

U.S. Pat. No. 5,853,454 discloses a mass flow gravity feed furnace charger apparatus includes a charge-well cover having an aperture and an essentially vertical conduit for forming a substantially vertically-oriented column of metal chips or scrap within and above the aperture, and structure for bringing both the cover and conduit into position above a charge-well. The conduit is rapidly movable up and down to force the metal chips or scrap into molten metal in the charge-well even when the dross level at the surface of the molten metal is considerable, so that the apparatus and corresponding methods permit charging when gravity feed alone is not sufficient or sufficiently rapid. In a preferred embodiment, the conduit has an interior surface provided with gripping means to assist with the downward movement of metal chips or scrap into the molten metal in the charge well when the up and down motion of the conduit is in effect.

U.S. Pat. No. 5,919,283 discloses an inert gas bubble-actuated molten metal pump is located between one section of a metal-melting furnace and a second section to pump molten metal form the one section, wherein the molten metal is at a higher temperature, into the second section, wherein the molten metal is at a lower temperature, and its effluent is directed into contact with metal chips being charged into the second section, thereby assisting in the more rapid melting of the chips into the molten metal mass in the second section. The inert gas employed to acturate the molten metal pump is captured beneath a heat-resistant and flame-resistant cover located above the exit port of the pump and over a substantial portion of the molten metal mass in the second section, thereby providing a non-oxidizing atmosphere at the surface of the molten metal mass or pool beneath said cover. In this manner the inert gas is employed not only to actuate the inert gas bubble-actuated molten metal pump, but also to assist in the rapid melting of metal chips being charged, as well as to provide a non-oxidizing atmosphere at the surface of the molten metal.

U.S. Pat. No. 5,984,999 discloses an arrangement in which the vortex well of a metal melting furnace is provided with an internal cavity having a circular cross section when viewed from the top, preferably a cavity of cylindrical or conical configuration, and with a peripheral exit port located tangentially with respect to said cavity at a lower level thereof for exit of molten metal into the main chamber of the furnace. An inert gas bubble-actuated molten metal pump brings molten metal from a hotter section of the furnace, advantageously directly form the main chamber, and has its exit port located tangentially to the periphery of the cavity at an upper level thereof, thereby creating vortical flow of molten metal therein and for circulation of hotter molten metal throughout the furnace. A head of molten metal can be created in the vortex well, which advantageously has an exit port of restricted internal cross-sectional area, to assist with attainment of these objective. A heat and flame-resistant cover may be located above the cavity and advantageously has an aperture therein for the loading of metal chips or scrap thereinto. A gravity-feed chip charger may surmount the aperture for the discharge of new metal chips or scrap into the cavity through the said aperture.

U.S. Pat. No. 6,068,812 discloses an inert gas bubble-actuated molten metal pump, for the movement of molten metal in a molten-metal bath, which obviates the necessity of a heat proof and flameproof cover to counteract splashing and spattering at the surface of the molten metal bath above the pump, comprising an inert gas diffusion means at an upper end thereof, the diffusion means having an upper surface containing a multiplicity of small upwardly-opening apertures for the breaking up of large bubbles and the diffusion of small bubbles of inert gas upwardly therethrough. The pump includes a refractory block which comprises a conveying conduit which is preferably elongated in width and a spreader cavity in communication with both a passageway in the block for providing a source of inert gas and a lower end of the conveying conduit.

My above referenced patents are incorporated herein by reference.

The purpose for creating a vortex in the vortex well is to rapidly submerge the small particles of metal whose mass would otherwise prevent the particles from penetrating the surface tension of the molten metal bath, thus causing a substantial increase in the percentage of metal loss due to oxidation. It has, however, has been determined that further steps must be taken to reduce oxidation, particularly when relatively more expensive metals such as aluminum are being used.

SUMMARY OF THE INVENTION

It is an object of the present invention to provide a means for further reducing metal losses due to oxidation in the vortex molten bath.

It is another object of the present invention to provide a way of integrating the functions of circulating molten metal and submerging metal chips in molten metal vortex to allow for rapid recovery of any temperature drop which may result from the introduction of the cold scrap.

It is still another object of the present invention to provide a means for efficiently burning off volatile hydrocarbons which may be present with metal chips that are being melted.

These and other objects are attained by the present invention which is a metal melting closed furnace which includes a main chamber, a circulation well connected to the main chamber by a communications passageway and a vortex well having an exit outlet for molten metal into the main chamber. A cover or other suitable containment means is emplaced above the vortex well. An inert gas bubble activated molten metal pump is provided in which there is an entry port in the circulation well and exit port tangentially arranged with respect to the periphery of the cavity. This exit port will typically be at or near the top of the vortex well. In order to reduce oxidation, inert gas bubbles are captured from the discharge of the molten metal pump, creating an inert gas atmosphere or blanket above the molten metal vortex so that this inert gas atmosphere is continuously or intermittently replenished.

Also encompassed by the present invention is a process for melting metal in a furnace in which molten metal is heated in a main chamber and then circulated to a circulation well. The molten metal is then moved from the circulation well by an inert gas bubble actuated pump to the vortex well. An inert gas atmosphere is formed below the cover and is continuously or intermittently replenished by inert gas from the bubbles in the pump.

Also encompassed by the present invention is a metal-melting furnace which includes a main chamber and a circulation well connected to the main chamber by a communication passageway. There is also a vortex well having periphery, a top and an exit outlet for recovering molten metal therefrom, and a cover is emplaced over the vortex well. On occasion, the vortex well is the circulation well. The furnace also includes an inert gas bubble actuated molten metal pump having an entry port in the circulation well and an exit port tangentially arranged with respect to the periphery of said vortex well at or near the top of the vortex well, wherein the exit port is positioned at a vertical position which is higher than the entry port. There is also an inert gas atmosphere positioned in the vortex well above the surface of molten metal.

Also encompassed by the present invention is a metal-melting furnace which includes a main chamber and a circulation well connected to the main chamber by a communication passageway. There is also a vortex well having a periphery, a top and bottom exit outlet for recovering molten metal therefrom, and a cover or other containment means is emplaced over the vortex well. The furnace also includes an inert gas bubble actuated molten metal pump having an entry port in the circulation well and an exit port tangentially arranged with respect to the periphery of said vortex well at or near the top of the vortex well. There is also an inert gas atmosphere positioned in the vortex well beneath the cover.

Also encompassed by the present invention is a metal melting furnace which includes a main chamber and a circulation well containing molten metal having a surface level connected to the main chamber by a communication passageway. There is a vortex well having a periphery, a top and an exit outlet for recovering molten metal therefrom, and a cover is emplaced over the vortex well. The furnace also includes a sensor for measuring the surface level of the molten metal in the circulation well and a means for stopping feed to the vortex well to prevent over filling of the furnace.

Also encompassed by the present invention is a metal-melting furnace which includes a main chamber and a circulation well connected to the main chamber by a communication passageway. There is also a well block having, a vortex well, said vortex well having a periphery, top and an exit outlet for recovering molten metal therefrom. A cover is emplaced over the vortex well, wherein said cover has a periphery positioned in inward spaced relation to the well block to form a peripheral gas release space between said cover and the well block. The furnace also includes an inert gas bubble actuated molten metal pump having an entry port in the circulation well and an exit port tangentially arranged with respect to the periphery of said vortex well at or near the top of the vortex well. An inert gas and volatile hydrocarbon gas atmosphere is positioned in the charge well beneath the cover, and this atmosphere is releasable through said peripheral gas release space.

Also encompassed by the present invention is a metal-melting furnace which includes a main chamber and a circulation well connected to the main chamber by a communication passageway. There is also a vortex well, which may sit in or be the circulation well, containing a molten metal vortex and having a periphery, a top and an exit outlet for recovering molten metal therefrom and a cover is emplaced over the vortex well adjacent the surface of the molten metal vortex. The furnace also includes an inert gas bubble actuated molten metal pump having an entry port in the circulation well and an exit port tangentially arranged with respect to the periphery of said vortex well at or near the top of the vortex well. An inert gas atmosphere is also positioned in the vortex well beneath the cover or above the surface of molten metal.

Also encompassed by the present invention is a metal-melting furnace which includes a main chamber and a circulation well connected to the main chamber by a communication passageway. There is also a vortex well having a periphery, a top and an exit outlet for recovering molten metal therefrom and a cover emplaced over the vortex well. A feed tube extends through said cover to enable metal chips to be added to the vortex well adjacent the periphery of said vortex well. The furnace also includes an inert gas bubble actuated molten metal pump having an entry port in the circulation well and an exit port tangentially arranged with respect to the periphery of said vortex well at or near the top of the vortex well. An inert gas atmosphere is also positioned in the vortex well beneath the cover.

Also encompassed by the present invention is a metal-melting furnace which includes a main chamber and a circulation well connected to the main chamber by a communication passageway. The furnace also includes a vortex well having a periphery, a top and an exit outlet for recovering molten metal therefrom and said vortex well is positioned in a vortex well block. A cover is also emplaced over the vortex well. There is also an inert gas bubble actuated molten metal pump having an entry port in the circulation well and an exit port tangentially arranged with respect to the periphery of said vortex well at or near the top of the vortex well. An inert gas atmosphere is positioned in the vortex well beneath the cover. An end block is also positioned in adjoining relation to the vortex well block. These blocks are connected by a projection extruding from one block which engages a recess in the other block. The circulation well is contained in said adjoining blocks.

Also encompassed by the present invention is a metal-melting furnace which includes a main chamber and a circulation well connected to the main chamber by a communication passageway. There is also a vortex well having a periphery, a top and an exit outlet for recovering molten metal therefrom and may include a cover emplaced over the vortex well. A feed tube extends through said cover to enable metal chips to be added to the vortex well. The vortex well is adapted to hold molten metal up to a maximum level from the bottom of the vortex well. The furnace also includes an inert gas bubble actuated molten metal pump having an entry port in the circulation well and an exit port to the vortex well. The exit port is positioned so that it is adapted to lie at least partially above the maximum level of molten metal held in the vortex well. Preferably, the exit port lies at least 50% or entirely above the maximum level of molten metal in the vortex well. An inert gas atmosphere is also positioned in the vortex well beneath the cover or containment means.

BRIEF DESCRIPTION OF THE DRAWINGS

The present invention is further described by means of the accompanying drawing in which.

DETAILED DESCRIPTION OF THE PREFERRED EMBODIMENTS

Figure 7:
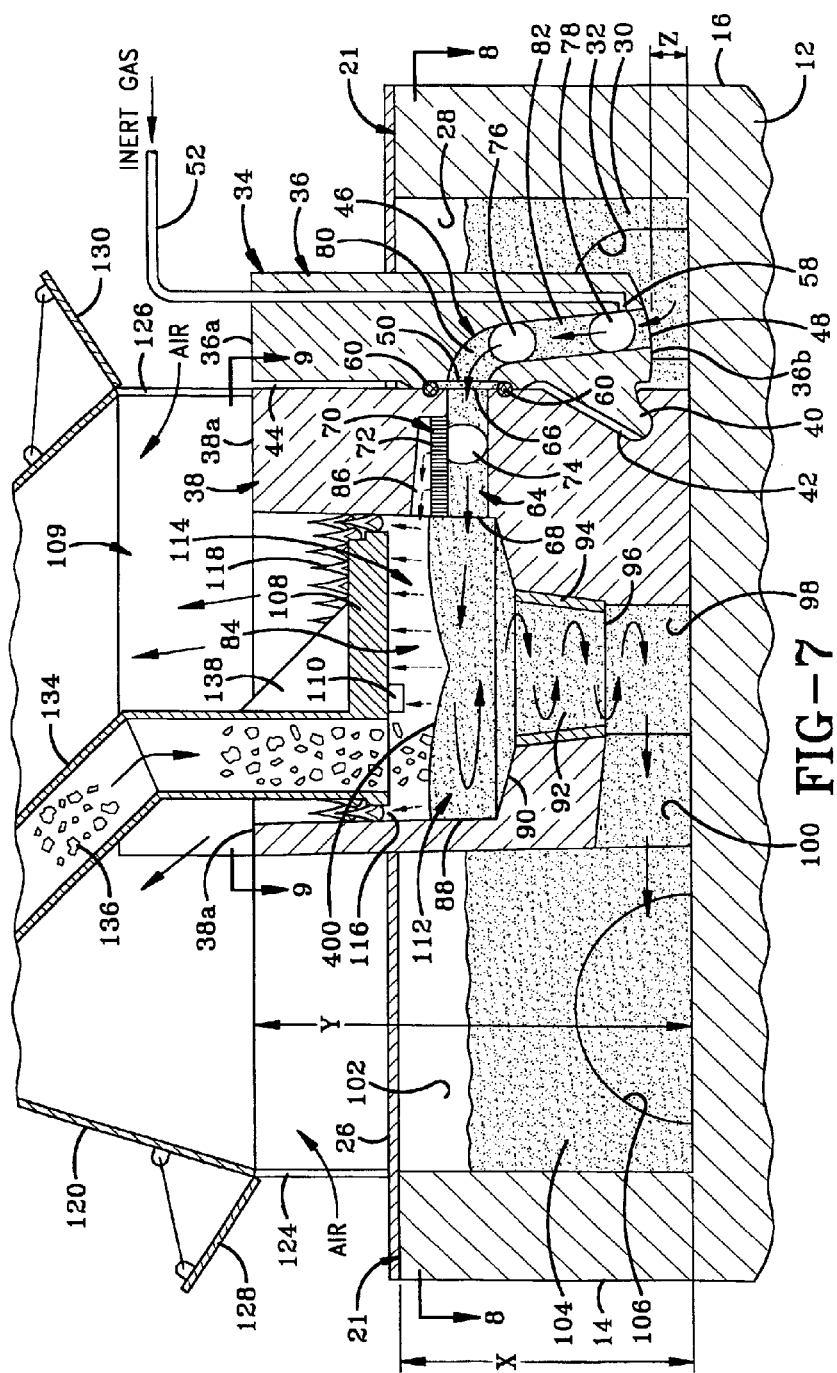
FIG. 7 is a detailed view of area 7 in FIG. 1.
Figure 8:
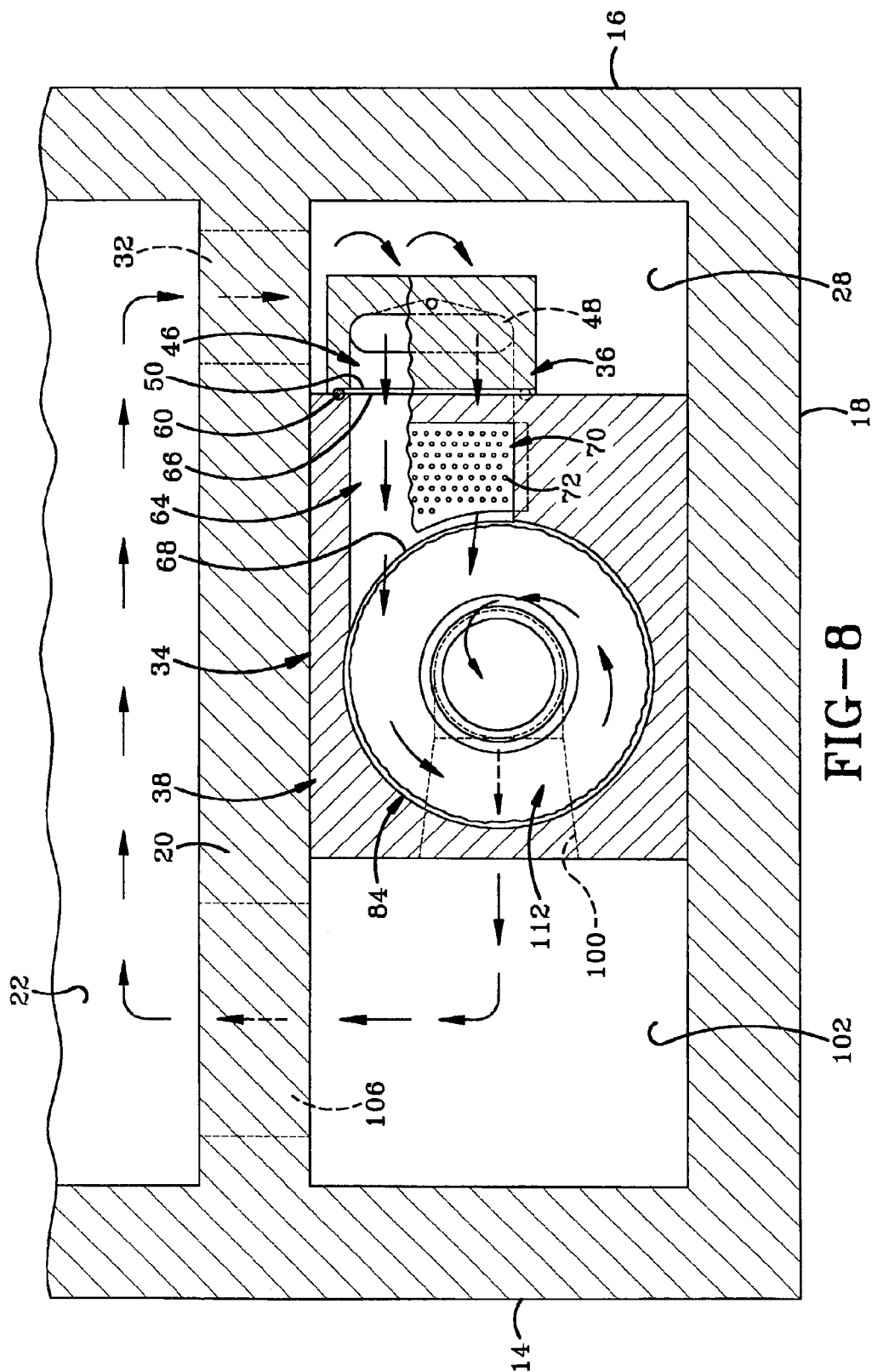
FIG. 8 is a cross sectional view through 8—8 in FIG. 7.
Figure 9:
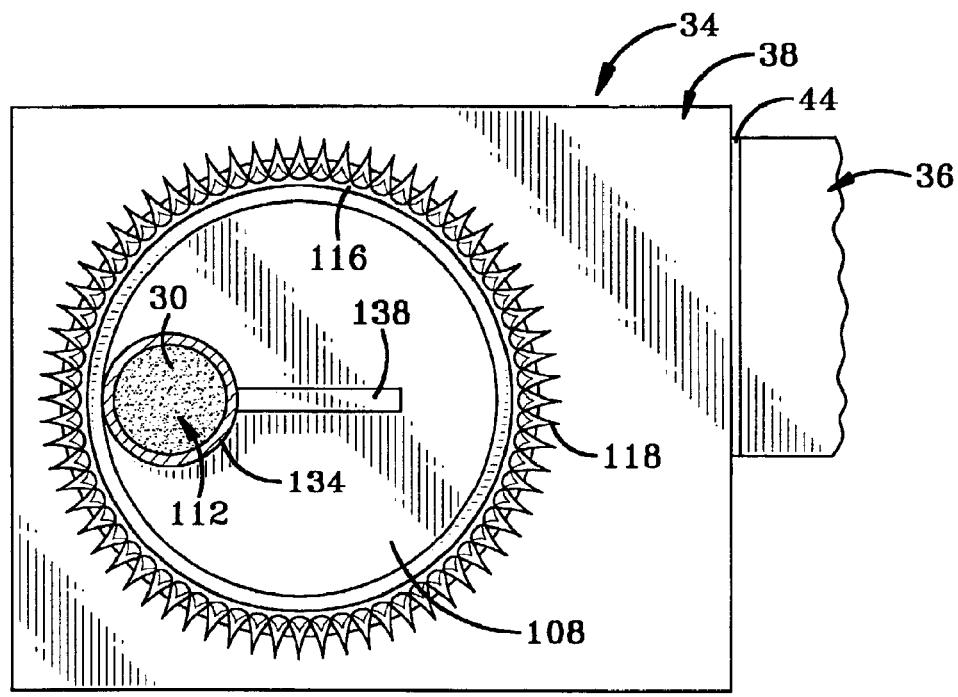
FIG. 9 is a partial top view of the well block and end block from 9—9 in FIG. 7.

Referring to FIGS. 1–9, the furnace is shown generally at 10 has a bottom wall 12, side walls 14 and 16, front wall 18 and a rear wall 19. Furnace 10 also has an intermediate transverse wall 20 which defines along with the rear wall a main chamber 22. Side walls 14, 16, front wall 18, rear wall 19 and transverse wall 20 all extend upwardly from bottom wall 12 and terminate at an upper edge 21. Upper edge 21 lies a first height "X" above bottom wall 12 (FIG. 7). Conventional fossil fuel burners (not shown) are used to maintain a molten metal bath 24 in this main chamber. Main chamber 22 also has a cover, shown in fragment, at numeral 26. Adjacent main chamber 22 is a circulation chamber 28 also having a molten metal bath 30 which is connected to main chamber 22 by means of communicating passageway 32. The molten metal may be aluminum, magnesium, zinc, copper, brass or steel. Adjacent the circulation chamber 28 there is a molten metal pump shown generally at 34 which includes an end block 36. Adjacent end block 36 there is well block 38. Preferably well block 38 is a separate and replaceable block of refractory material. It would alternatively be possible to integrate end block 36 and well block 38 into a single unit. End block 36 and well block 38 have upper surfaces 36a and 38a which lie a second height "Y" above bottom wall 12 of furnace 10 (FIG. 7). Second height "Y" is greater than first height "X" so that the upper surfaces 36a, 38a of end block 36 and well block 38 extend vertically above upper edge 21 of side, front and rear walls 14, 16, 18, 19 relative to bottom wall 12.

Figure 1:
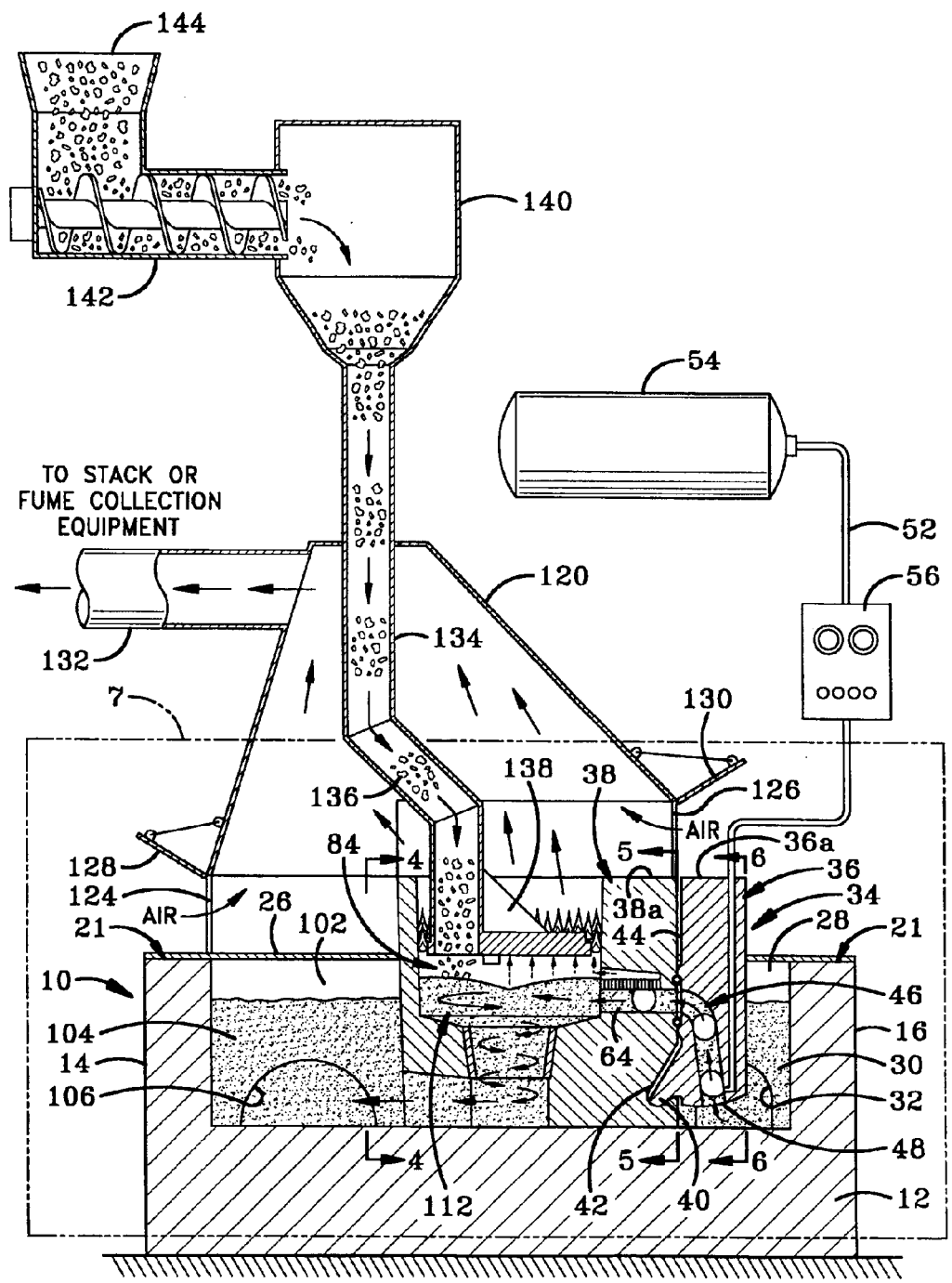
FIG. 1 is a vertical cross-sectional view of a molten metal pump and furnace for use therewith which comprises a first preferred embodiment of the present invention.
Figure 2:
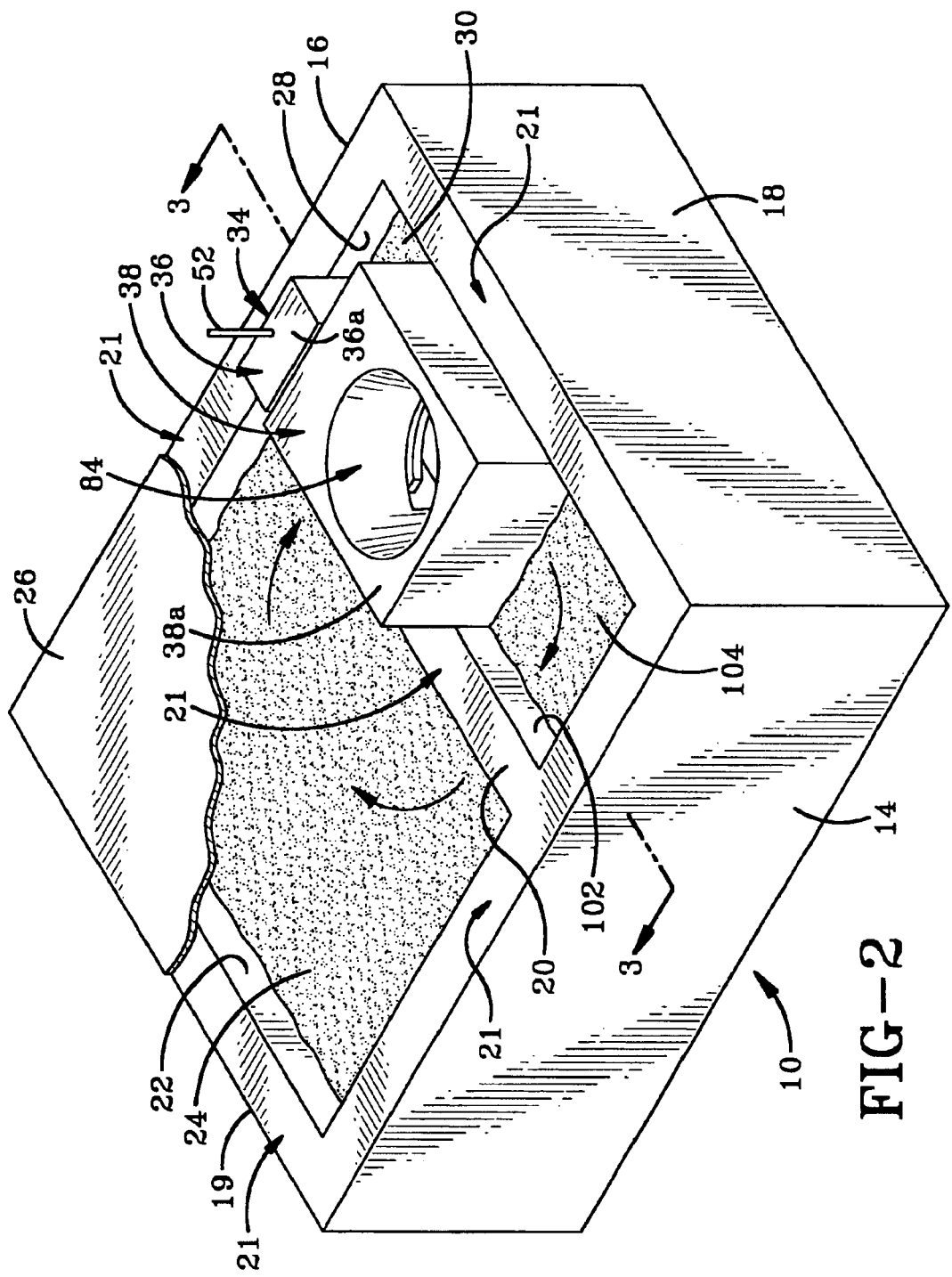
FIG. 2 is a cut away perspective view of the main molten metal chamber, circulation wall, vortex well and adjacent chamber of the molten metal pump and furnace in FIG. 1.
Figure 3:
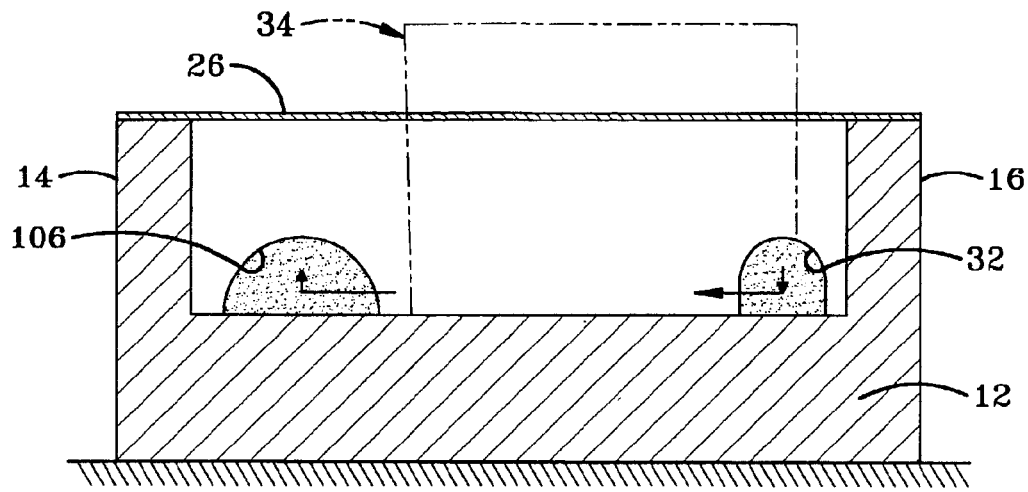
FIG. 3 is a cross-sectional through 3—3 in FIG. 2.
Figure 4:
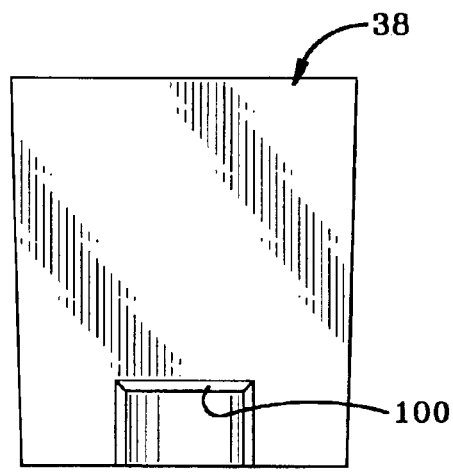
FIG. 4 is a partial end view of the molten metal pump and furnace shown in FIG. 1 from 4—4.
Figure 5:
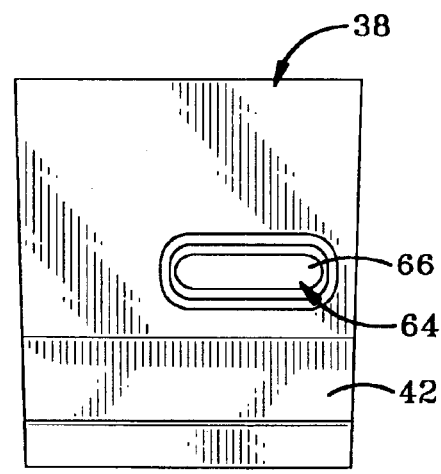
FIG. 5 is a cross-sectional view through 5—5 in FIG. 1.
Figure 6:
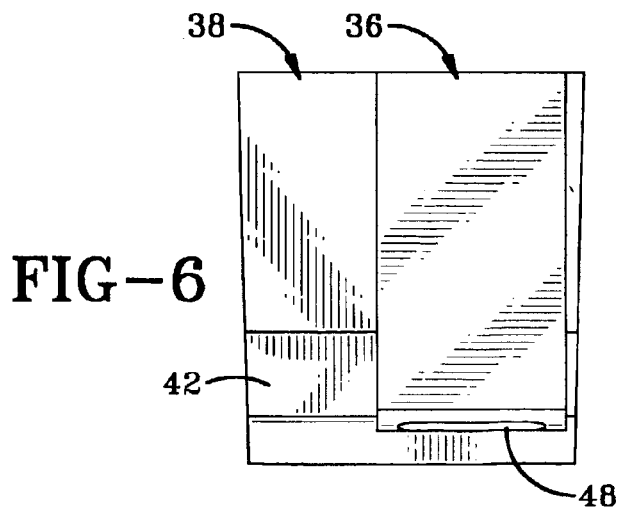
FIG. 6 is an end view from 6—6 of the molten metal pump and furnace shown in FIG. 1.

In accordance with one of the features of the present invention, in end block 36 there is formed an end block projection 40 which engages in recess 42 on well block 38. Between end block 36 and well block 38 there is also a vertical space 44. As may be seen in FIG. 7, in end block 36 there is a vertical passageway 46 which has a lower opening or entry port 48 and a medial outlet 50. An inert gas line 52 extends from a tank 54 containing nitrogen, argon or other inert gas, to controls 56 and then to inert gas outlet 58 into passageway 46. Adjacent medial outlet 50 of vertical passageway 46 there is a seal 60 at the point vertical passageway 46 connects to horizontal passageway 64 in well block 38. Horizontal passageway 64 has an opening 66 and an outlet or exit port 68 adjacent a plate 70 with a plurality of apertures as at aperture 72. As is conventional in molten metal pumps, such as in molten metal pump 34, there are a plurality of inert gas bubbles 74, 76, and 78 in vertical passageway 46 and horizontal passageway 64. Bubbles 74, 76 and 78 rise through passageways 46, 64 to move molten metal masses as at 80 and 82 from circulation chamber 28 to vortex well (shown generally at 84). Above plate 70 there is an inert gas collection recess 86 in well block 38. Vortex well 84 has an upper region 88, medial region 90 and a lower region 92 with a surrounding liner 94. At the bottom of the lower region 92 there is a lower outlet 96 which communicates with a bottom recess 98 in well block 38. A horizontal passageway 100 extends through to an intermediate well 102. In this intermediate well 102 there is another molten metal bath 104 which re-circulates back to main chamber 22 by means of communicating passageway 106. Above vortex well 84 there is a refractory cover 108. Other suitable vortex well containment means such as an upward extension of the vortex well shown generally as numeral 109 in FIG. 7 may be substituted for cover 108. Cover 108 will be equipped with a sensor 110 which overlies a molten metal vortex 112 in vortex well 84. Sensor 110 senses the surface level 109 of molten metal vortex 112 to enable cover 108 to be raised or lowered as is described hereafter. Between cover 108 and molten metal vortex 112 there is an inert gas atmosphere or blanket 114 which is continuously or intermittently replenished with inert gas from inert gas bubbles in molten metal pump 34. These bubbles enter recess 86 through apertures, as at aperture 72, in plate 70. Between cover 108 and well block 38 there is a peripheral space 116 which allows for the formation of a combustion zone 118 for allowing oils, paints, lacquers as well as other volatile hydrocarbons to exit from below cover 108 and be burned off. It will be appreciated that this peripheral space 116 will also allow the escape of inert gas from the inert gas atmosphere or blanket 114 as additional inert gases are added to this space. Well cover 108 will have sufficient space around its periphery to allow oil, paints, lacquer or nitrogen, as well as any other volatile hydrocarbons which have been carried into the molten metal stream or the scrap charge material, to exit from below cover 108. Heat resistant cover 108 may be adjustable in height, but normally provides several inches of clearance above surface level 109 of molten metal bath for the containment of the replenishing supply of inert gas. As seen in FIG. 1, above combustion zone 118 there is a smoke collection hood 120 with air intakes 124 and 126 having respective closure doors 128 and 130. From smoke collection hood 120 there is a line 132 to a stack or particle collection equipment (not shown). Extending downwardly through smoke collection hood 120 there is a scrap feed tube 134 in which scrap as in metal chips 136 are fed into molten metal vortex 112 in vortex well 84. It will be appreciated that metal scrap may be substituted for metal chips and, for the purposes of this disclosure, the term "metal chips" should be understood to include both metal chips and metal scrap. Metal chips 136 are preferably fed tangentially into molten metal vortex 112 adjacent the periphery of vortex well 84. Feed tube 134 is attached to cover 108 by means of a flange 138. At its upper end, feed tube 134 receives metal chips from a hopper 140 which is in turn fed by a screw conveyor 142 which receives metal chips 136 from a feed opening 144.

Figure 10:
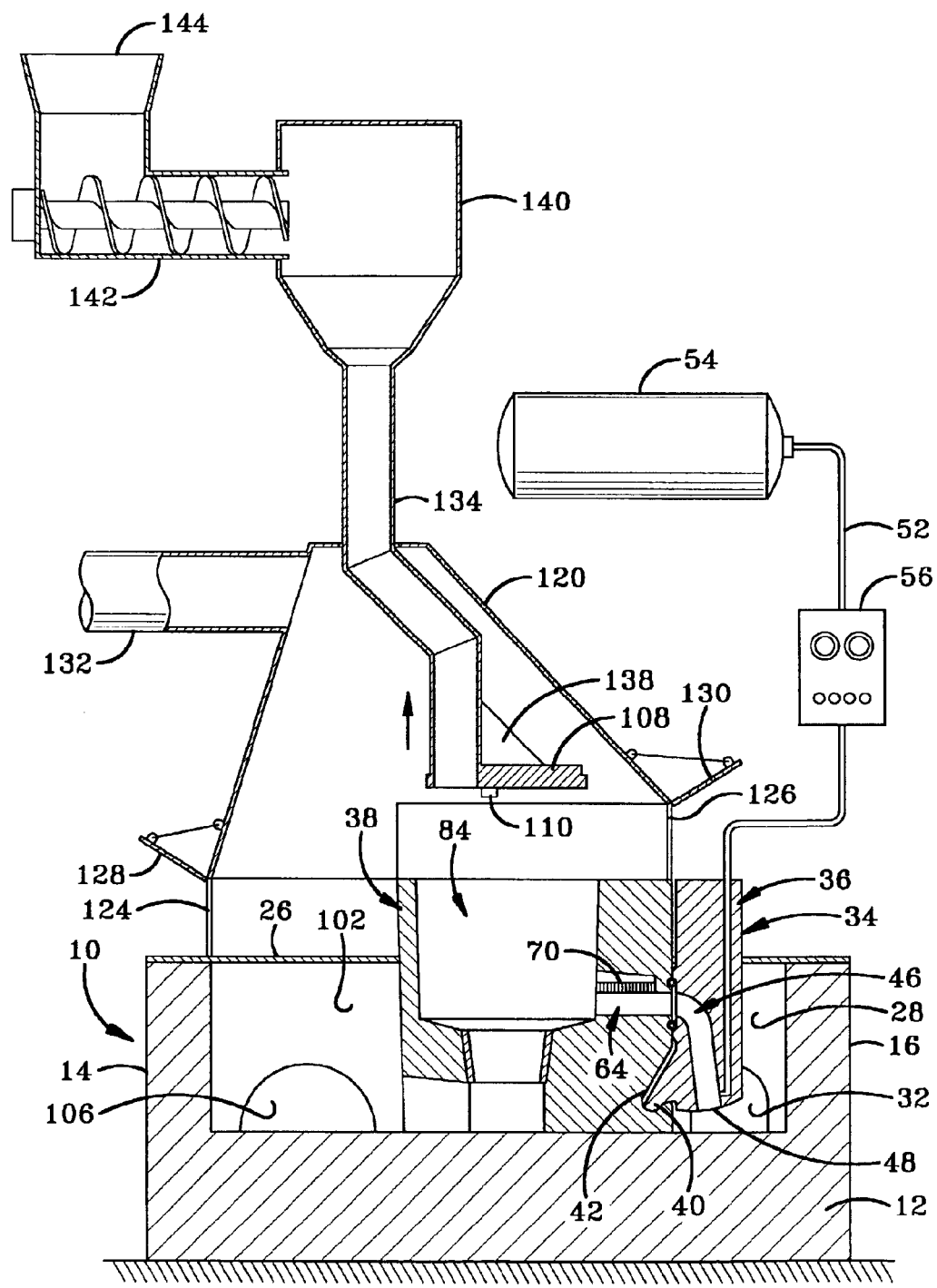
FIG. 10 is a vertical cross-sectional view similar to FIG. 1 in which the feed tube and vortex well cover are in their elevated positions.

Referring to FIG. 10, it will be seen that feed tube 134 and cover 108 may be withdrawn upwardly from vortex well 84 by well known conventional means.

Figure 11:
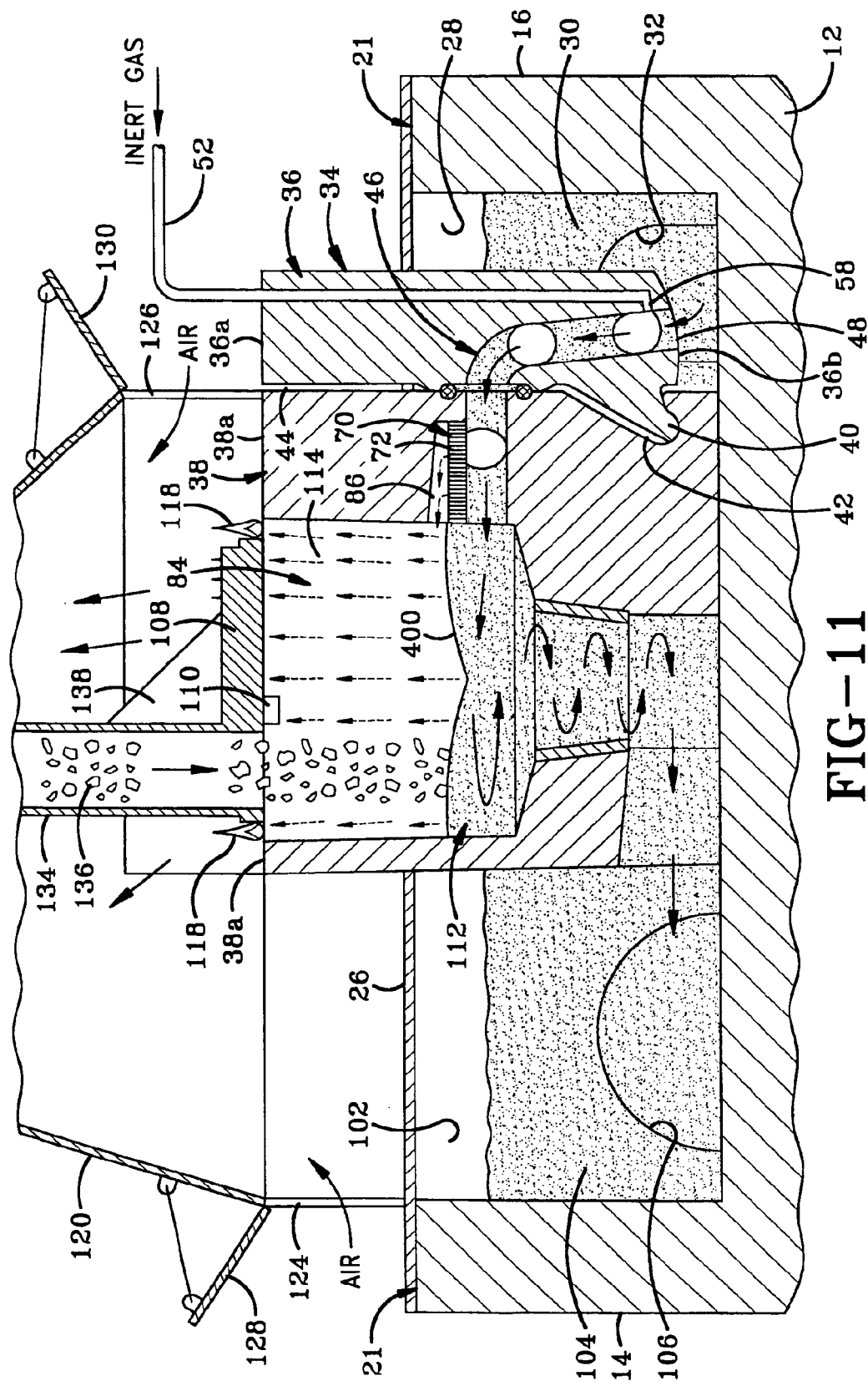
FIG. 11 is a detailed view similar to FIG. 7 in which the feed tube and vortex well cover are in intermediate elevated position still covering the vortex well.

Referring to FIG. 11, it will be seen that feed tube 134 may also be adjusted in height so that cover 108 lies proximate the top of vortex well 84. The height of inert gas blanket 114 is thereby adjusted.

Figure 12:
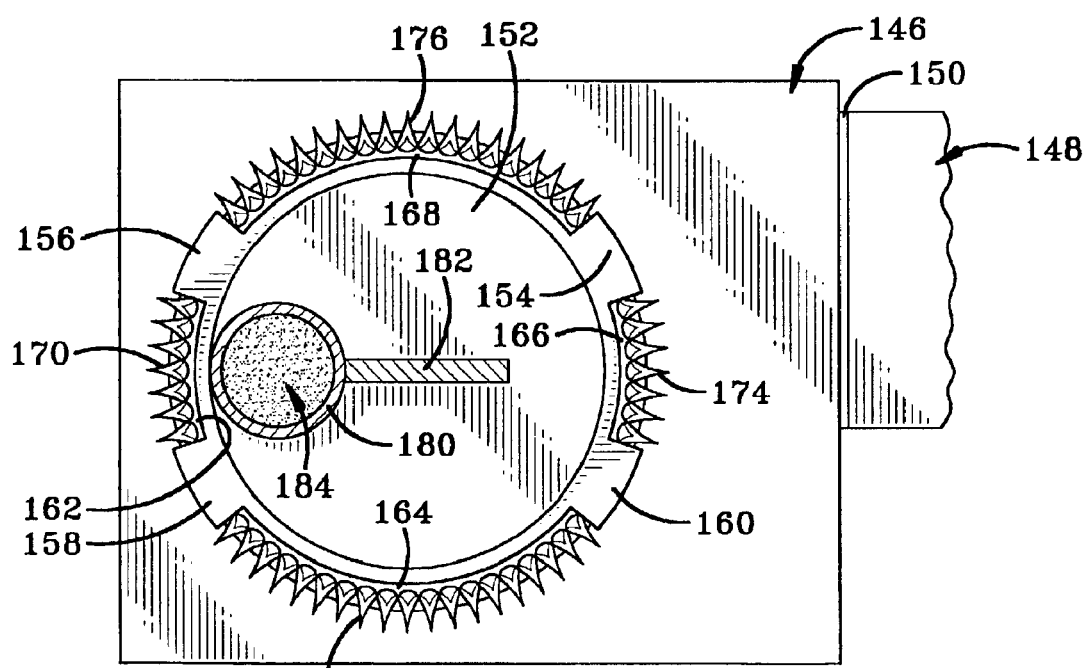
FIG. 12 is a top plan view of the vortex well lock and part of the end block from 12—12 in FIG. 11 in which an alternate vortex well cover is shown.

Referring to FIG. 12, an alternate embodiment of the cover is shown. In this embodiment a well block 146 is shown as well as a fragmented portion of end block 148. A vertical space 150 is interposed between the well block 146 and end block 148. An alternate cover 152 is positioned on the top of the well block 146 by means of radial peripheral supports 154, 156, 158 and 160. Between cover 152 and well block 148 there are peripheral spaces 162, 164, 166 and 168 and positioned above these peripheral spaces there are respectively combustion zones 170, 172, 174 and 176. A feed tube 180, that is connected to cover 152 by means of a bracket 182, allows metal chips to be fed into molten metal vortex 184.

Figure 13:
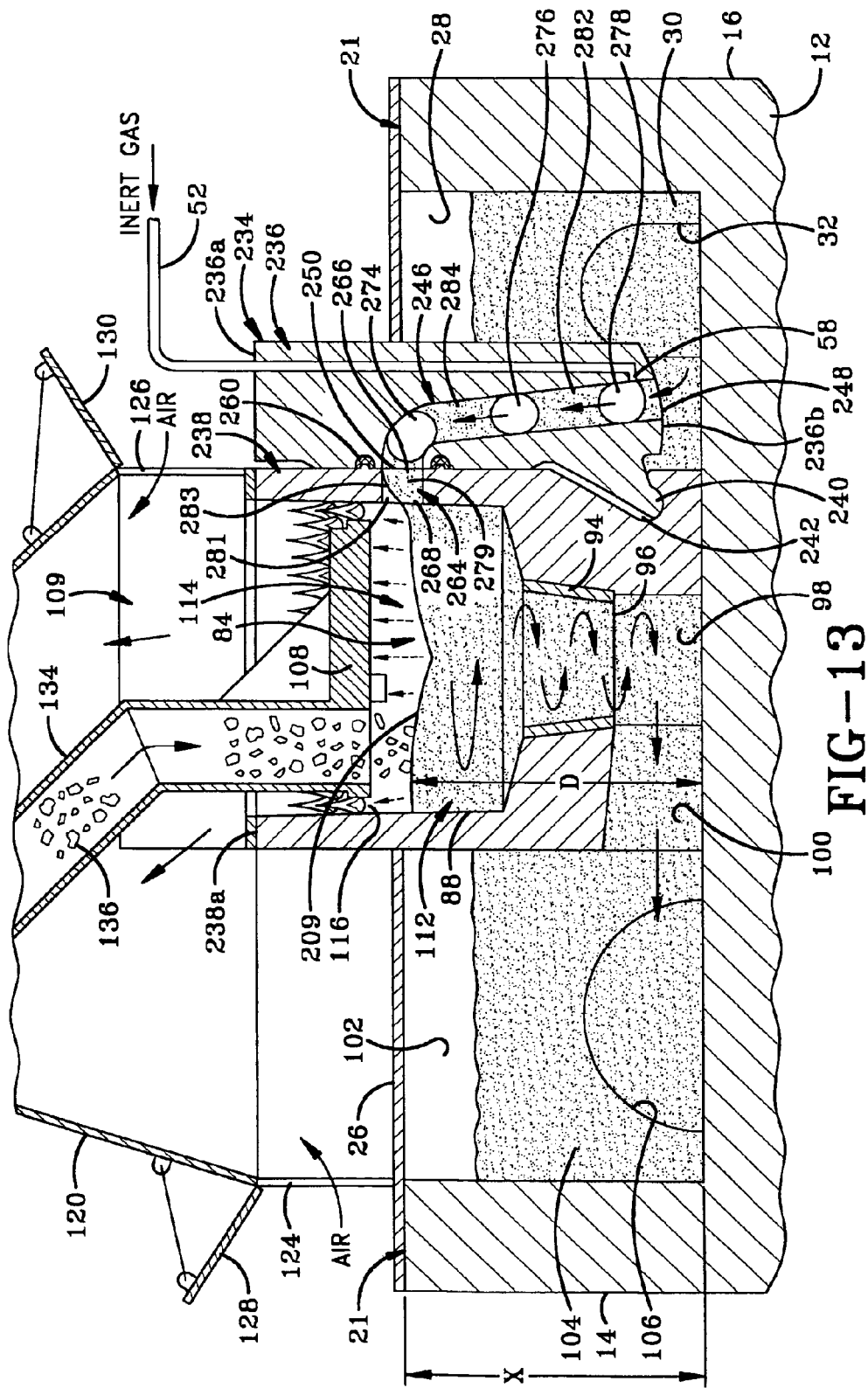
FIG. 13 is a detailed cross-sectional view of a second embodiment of a molten metal pump and furnace for use therewith in accordance with the present invention, in which the outlet of the molten metal pump is positioned at least partially above the uppermost level of molten metal in the vortex well.

Referring to FIG. 13, there is a shown a second embodiment of a molten metal pump and furnace in accordance with the present invention. The basic structure and function of the furnace is the same as previously described. However, the structure of the molten metal pump is different in that the outlet of the pump into the vortex well is at least partially elevated above the molten metal in vortex 112. A molten metal pump, generally shown at 234 lies adjacent the circulation chamber 28. Molten metal pump 234 includes an end block 236 and a well block 238. Preferably well block 238 is a separate and replaceable block of refractory material. It would alternately be possible to integrate end block 236 and well block 238 into a single unit. In end block 236 there is end block projection 240 which engages recess 242 on well block 238. End block 236 has a vertical passageway 246 which has a lower opening 248 and a medial outlet 250. An inert gas line 252 extends from a tank (not shown) containing nitrogen, argon or other inert gas in the same manner as previously described. Gas line 52 terminates in outlet 58 into passageway 246. Adjacent medial outlet 250 of vertical passageway 246 there is a seal 260 at the point vertical passageway 246 connects to horizontal passageway 264 in well block 238. Horizontal passageway 264 has an opening 266 and an outlet 268. Vortex well 84 is adapted to hold molten metal therein. When the maximum amount of molten metal is held within vortex well 84, the molten metal will rise to a maximum specific level signified by a distance D from the bottom wall 12 of the furnace 10. As will be understood by those skilled in the art, different size furnaces will be adapted to hold different maximum amounts of molten metal in the vortex well of that particular size furnace. Those different maximum amounts of molten metal will each rise to a different specific level for each size of furnace.

In accordance with one of the main features of the present invention, passageway 264 enters vortex well 84 at a point where at least part of the outlet 268 lies above the level D for that size furnace, i.e. at least partially above the level of the maximum amount of molten metal that may be held in the vortex well 84. Preferably outlet 268 enters vortex well 84 at a point where at least 50% of outlet 268 lies above level D, i.e. at least 50% of the outlet 268 will be elevated above the level of the maximum amount of molten metal that may be held in the vortex well 84. Horizontal passageway 264 has a longitudinal centerline and preferably that centerline lies at least 50% above level D.

As is conventional in molten metal pumps, such as in molten metal pump 234, there are a plurality of inert gas bubbles 274, 276, and 278 in vertical passageway 246 and horizontal passageway 264. Bubbles 274, 276 and 278 rise through passageways 246, 264 to move molten metal masses as at 279, 280 and 282 from circulation chamber 28 to the vortex well 84. By assuring that the outlet 268 is positioned at least partially and preferably at least 50% above the maximum level D of the molten metal in vortex well 84, the back-pressure exerted by molten metal in the vortex well 84 on the material in horizontal passageway 264 and vertical passageway 246 is substantially reduced. The reduction in back-pressure allows the bubbles 274, 276 and 278 and therefore the metal masses 279, 280 and 282 to move more easily through passageways 246 and 264. This increases the efficiency of the molten metal pump 234. As molten metal mass 279 is forced through horizontal passageway 264 and begins to flow into vortex 112, a gap 281 forms between the interior of passageway 264 and the upper surface 283 of molten metal mass 279. The inert gas bubble 274 moving through passageway 264 is released into gap 281 as molten metal mass 279 flows into vortex 112 and the gas becomes part of blanket 114.

It should also be noted that in the second embodiment of the present invention, the gas bubbles 274, 276 and 278 moving through said molten metal pump are directly released into the blanket 114 lying between the surface 209 of the molten metal in vortex 112 and the cover 108.

Figure 14:
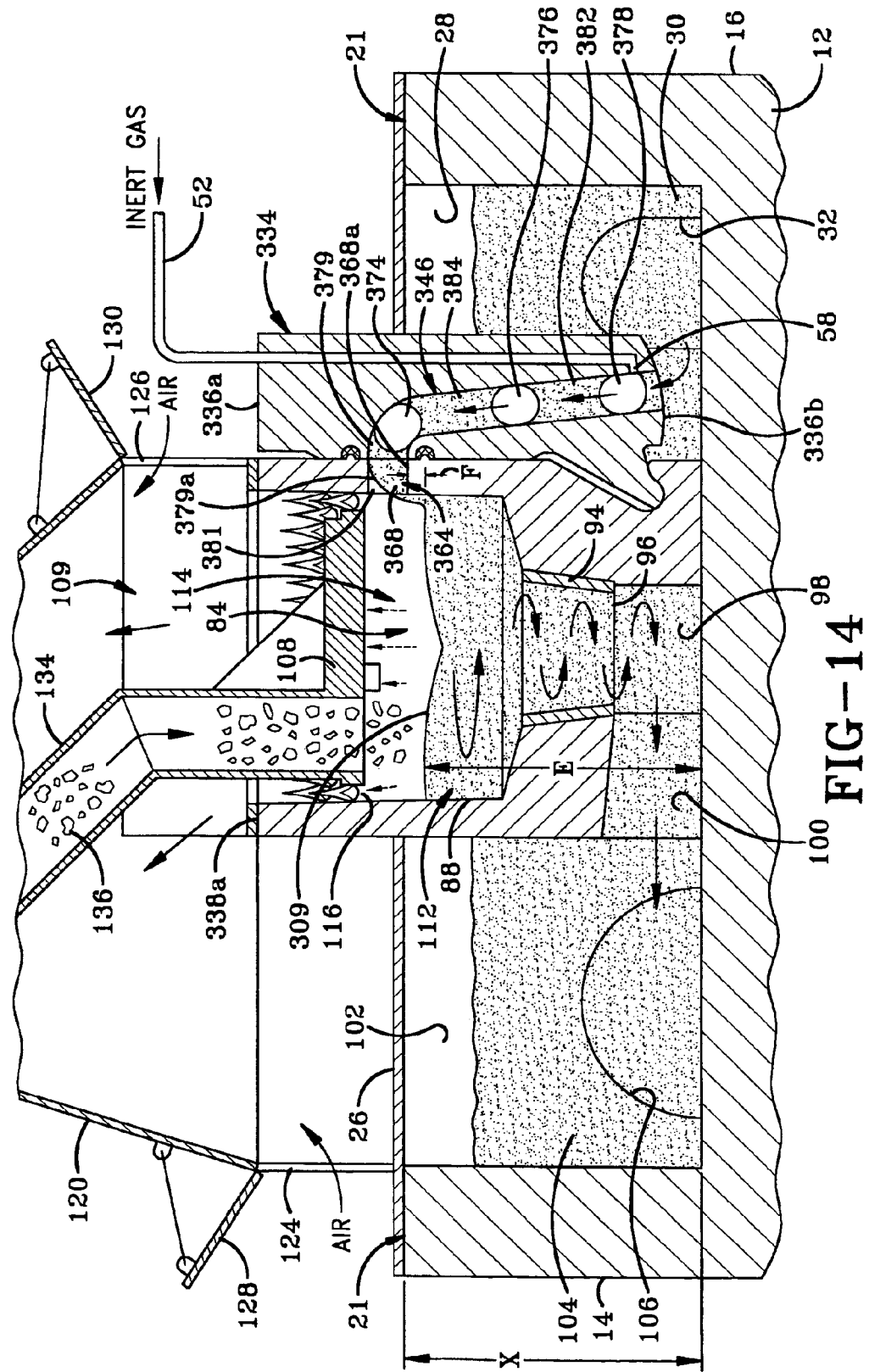
FIG. 14 is a detailed cross-sectional view of a third embodiment of a molten metal pump and furnace for use therewith in accordance with the present invention, in which the outlet of the molten metal pump is positioned totally above the level of molten metal in the vortex well.

A third embodiment of the invention is shown in FIG. 14. As with the second embodiment of the invention, the furnace's structure and function are the same as previously described. However, a third embodiment of the molten metal pump, generally referred to as 334, is provided. The basic structure of molten metal pump 334 is the same as in the second embodiment of the invention, except that the outlet 368 of the horizontal passageway 364 lies entirely above the level of the maximum amount of molten metal that may be held in the vortex well 84. The maximum level that the molten metal may rise to in vortex well 84 is signified by the distance E from the bottom wall 12 of furnace 10. As previously set out, it will be understood that different size furnaces will hold different amounts of molten metal and therefore level E will be different for different size furnaces. The bottom 368a of outlet 368 preferably is elevated a spaced distance F above the maximum level E of molten metal in vortex well 84. A gas bubble 374 moving through vertical passageway 346 pushes a metal mass 379 before it. As metal mass 379 begins to drop out of outlet 368 and into vortex 112, a gap 381 is formed between the interior of horizontal passageway 364 and the upper surface 379a of the molten metal mass 379. As molten metal mass 379 drops into vortex 112, gas bubble 374 merges with the gases in gap 381 and becomes part of blanket 114. The structure of molten metal pump 334 reduces the back-pressure that could be exerted by molten metal in the vortex 112 on the material in horizontal passageway 364 and vertical passageway 346. The reduction of the back-pressure allows bubbles 374, 376 and 378 and therefore the molten metal masses 379, 380 and 382 to move more easily through horizontal passageway 364 and vertical passageway 346. By assuring that the outlet 368 is positioned entirely above the maximum level E of the molten metal in vortex well 84, the back-pressure exerted by molten metal in the vortex well 84 on the material in horizontal passageway 364 and vertical passageway 346 is substantially reduced or eliminated. This again improves the efficiency of the molten metal pump and the furnace.

As was the case with the second embodiment of the present invention, the gas bubbles 374, 376 and 378 moving through said molten metal pump are directly released into the blanket 114 lying between the surface 309 of the molten metal in vortex 112 and the cover 108.

The operation of the furnace will be described with reference to the first embodiment of the invention, but it will be understood by those skilled in the art that all three embodiments of the invention function in essentially the same manner. In the operation of the molten metal pump and furnace of the present invention, metal chips 136 are fed into feed opening 144 of conveyor 142. Conveyor 142 transports metal chips 136 to hopper 140 from which they descend into feed tube 134 and into vortex well 84. Chips 136 drop into molten metal vortex 112. At the same time, nitrogen or another inert gas is drawn from tank 54 through line 52 and controls 56. The gas forms bubbles, as at bubble 78, in vertical passage way 46 of molten metal pump 34. These inert gas bubbles move molten metal masses, as at mass 82, from molten metal bath 30 in circulation chamber 28 to molten metal vortex 112 in vortex well 84. When these bubbles, as in bubble 74, enter horizontal passageway 64 of molten metal pump 34, they pass through apertures, as at aperture 72, in plate 70 to enter recess 86. Thereafter the bubbles enter vortex well 84 between molten metal vortex 112 and cover 108 to form inert gas atmosphere or blanket 114. Alternatively inert gas blanket 114 may be contained by the upwardly extending walls of vortex well 84. This inert gas blanket 114 reduces the formation of oxidation on the metal chips entering molten metal vortex 112. Oil, paints, lacquers and other volatile hydrocarbons which may be present within the metal chips are volitized and passed through peripheral space 116 (FIG. 7) between cover 108 and well block 38 to be burned in combustion zone 118.

Metal chips flow along with the rest of molten metal vortex 112 in a swirling downward path to outlet 96, through medial region 90, into lower region 92, through outlet 96 and into bottom recess 98. The direction of the molten metal is then changed to a lateral flow path through horizontal passageway 100 into intermediate well 102. From intermediate well 102, molten metal in molten metal bath 104 moves through passageway 106 and into main chamber 22. After heating in main chamber 22, molten metal passes through passageway 32 into circulation chamber 28. From molten metal bath 30 in circulation chamber 28, the molten metal is again pumped through molten metal pump 34 and back to vortex well 84 where additional metal chips are added under inert gas blanket 114 in the manner previously described. It will be understood that it would alternately be possible to remove molten metal from passageway 32 adjacent circulation chamber 28 to vortex well 84. For the purposes of this disclosure, the removal of molten metal from circulation chamber 28 to vortex well 84 will be considered to also include the embodiment of removing molten metal from adjacent passageway 32.

It will be appreciated that a molten metal pump and furnace for use therewith and a method for its operation has been described in which oxidation of metal chips entering molten metal vortex is substantially reduced.

It will also be appreciated that the present invention allows for the combination of the functions of circulating molten metal in a fossil fuel reverberatory furnace and submerging metal chips in an open sidewell chamber to cause the melted feed stock to be rapidly circulated back into the main chamber of the furnace. Any resulting loss in temperature due to the introduction of the cold scrap, can quickly be recovered in the presence of the combustion burners located in the enclosed main chamber of the furnace.

It will also be appreciated that the present invention also lends itself to melting materials such as used beverage cans (UBC) with substantially improved melt yield, without requiring the prior step of de-lacquering the UBC in advance of this melting process.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A metal-melting furnace comprising:
 a main chamber;
 a circulation chamber connected to the main chamber by a communication passageway;
 a vortex well having a bottom wall with a peripheral side wall extending upwardly therefrom, the side wall having a upper edge; the vortex well further having an outlet into the main chamber;
 a gas bubble actuated molten metal pump having:
  an entry port in operative communication with the circulation chamber; and
  an exit port in operative communication with the vortex well; said exit port entering the vortex well through the side wall thereof;
 wherein the furnace is adapted to receive a quantity of molten metal within the vortex well up to a maximum height; and wherein the exit port enters the vortex well at a spaced distance from the upper edge of the vortex well and at a height at least partially above the maximum height for molten metal in the vortex well.

2. The furnace of claim 1, wherein the exit port is tangentially arranged with respect to the side wall of the vortex well.

3. The furnace of claim 2, wherein the exit port is disposed at or near the upper edge of the side wall of the vortex well.

4. The furnace of claim 3, further comprising a containment means emplaced over the vortex well and wherein the molten metal pump is adapted to have gas bubbles moving through it and out of the exit port and the gas bubbles are released directly into a space between the molten metal and the containment means.

5. The furnace of claim 1, wherein the molten metal pump is disposed within the circulation chamber.

6. The furnace of claim 1, wherein at least 50% of the exit port of the molten metal pump is disposed-above the maximum possible level of the molten metal.

7. The furnace of claim 6, wherein the exit port has a longitudinal centerline and the exit port is disposed within the vortex well in a position where the centerline lies above the maximum possible level of the molten metal.

8. The furnace of claim 7, wherein the exit port is tangentially arranged with respect to the peripheral side wall of the vortex well.

9. The furnace of claim 8, wherein the exit port is disposed at or near the edge of the side wall of the vortex well.

10. The furnace of claim 6, further comprising a containment means emplaced over the vortex well and wherein the molten metal pump is adapted to have gas bubbles moving through it and out of the exit port and the gas bubbles are released directly into a space between the molten metal and the containment means.

11. The furnace of claim 1, wherein the exit port is disposed entirely above the maximum level of the molten metal.

12. The furnace of claim 11, wherein the exit port is tangentially arranged with respect to the peripheral side wall of the vortex well.

13. The furnace of claim 12, wherein the exit port is disposed at or near the edge of the side well of the vortex well.

14. The furnace of claim 13, wherein the exit port has a lowermost wall and the lowermost wall is positioned to lie a spaced distance above the maximum level of the molten metal.

15. The furnace of claim 11, further comprising a containment means emplaced over the vortex well, and wherein the molten metal pump is adapted to have gas bubbles moving through it and out of the exit port and the gas bubbles are released directly into a space between the molten metal and the containment means.

16. The furnace of claim 11, wherein the molten metal pump is disposed within the circulation chamber.

17. A metal-melting furnace comprising:

a main chamber;

a circulation chamber in operative communication with the main chamber;

a well block disposed within the circulation chamber;

a vortex well formed within the well block and being adapted to hold a maximum quantity of molten metal therein;

an end block;

a gas bubble actuated molten metal pump contained within the end block and said end block engaging the well block; the pump having an entry port in operative communication with the circulation chamber and an exit port in operative communication with the vortex well.

18. The metal-melting furnace of claim 17, wherein the end block is disposed within the circulation chamber adjacent the well block.

19. The metal-melting furnace of claim 18, wherein the well block is provided with a recess and the end block is provided with a complementary sized and shaped projection, and wherein the recess and projection engage each other.

20. The metal-melting furnace of claim 19, further including a vertical passageway formed between the engaged well block and end block.

21. The metal-melting furnace of claim 20, further comprising at least one seal disposed in the vertical passageway between the well block and end block, the seal preventing molten metal flowing from the metal pump into the vortex well from leaking into the vertical passageway.

22. The metal-melting furnace of claim 20, further comprising a ridge formed on one of the well block and end block, the ridge being disposed outwardly from the at least one seal to retain the seal in position in the vertical passageway.

23. The metal-melting furnace of claim 19, wherein a gap is formed between the projection on the end block and the well block when the end block is engaged with the well block.

24. The metal-melting furnace of claim 19, wherein the end block has a bottom surface and the circulation chamber has a bottom and the end block engages and is supported by the well block so that the bottom surface of the end block is disposed a spaced distance above the bottom of the circulation chamber.

25. The metal-melting furnace of claim 24, wherein the end block includes an entry port in its bottom surface and molten metal enters the pump through the entry port in the bottom surface.

26. The metal-melting furnace of claim 25, wherein the well block has an upper surface and the end block has a upper edge and the upper surface and upper edge are substantially coplanar when the well block and end block are engaged with each other.

27. A metal-melting furnace comprising:

a body formed with at least one vortex well disposed in a well block; and a molten metal pump disposed in an end block; and wherein the end block is positioned adjacent to the well block and is engaged therewith and supported thereby, and wherein the pump is adapted to circulate molten metal within the vortex well.

* * * * *